United States Patent
Brock et al.

(10) Patent No.: US 8,855,271 B2
(45) Date of Patent: Oct. 7, 2014

(54) INTELLIGENT DISPOSITION MANAGER

(75) Inventors: Brett Brock, Roswell, GA (US); Brandon Hall Goode, Canton, GA (US); Robert C. Whitten, Kennesaw, GA (US)

(73) Assignee: Cox Communications, Inc., Atlanta, GA (US)

( * ) Notice: Subject to any disclaimer, the term of this patent is extended or adjusted under 35 U.S.C. 154(b) by 381 days.

(21) Appl. No.: 12/768,353

(22) Filed: Apr. 27, 2010

(65) Prior Publication Data

US 2011/0261945 A1 Oct. 27, 2011

(51) Int. Cl.
- H04M 1/64 (2006.01)
- H04M 3/42 (2006.01)
- H04M 3/54 (2006.01)
- H04M 3/436 (2006.01)
- H04L 12/58 (2006.01)
- H04M 7/00 (2006.01)

(52) U.S. Cl.
CPC ........ *H04M 3/42365* (2013.01); *H04M 7/0033* (2013.01); *H04M 2207/20* (2013.01); *H04M 3/543* (2013.01); *H04M 3/42263* (2013.01); *H04M 3/436* (2013.01); *H04L 51/24* (2013.01); *H04M 2203/4509* (2013.01); *H04L 12/587* (2013.01)
USPC .................. 379/88.12; 379/88.11; 379/88.22; 379/201.01; 379/211.02

(58) Field of Classification Search
CPC ..... H04M 3/537; H04M 3/533; H04L 12/587
USPC ........ 379/211.02, 88.21, 88.23, 88.14, 414.4, 379/435.3, 201.01, 201.07, 88.22, 88.11, 379/88.12, 88.13; 709/206; 725/106
See application file for complete search history.

(56) References Cited

U.S. PATENT DOCUMENTS

| | | | | |
|---|---|---|---|---|
| 5,930,700 | A * | 7/1999 | Pepper et al. | 455/435.3 |
| 6,408,177 | B1 * | 6/2002 | Parikh et al. | 455/414.4 |
| 6,807,423 | B1 | 10/2004 | Armstrong et al. | 455/440 |
| 7,224,774 | B1 * | 5/2007 | Brown et al. | 379/88.14 |
| 2006/0239424 | A1 | 10/2006 | Walter | 379/88.22 |
| 2007/0042791 | A1 | 2/2007 | Walter | 455/461 |
| 2007/0097994 | A1 | 5/2007 | Samdadiya et al. | 370/401 |
| 2008/0240384 | A1 * | 10/2008 | Suryanarayana et al. | 379/88.21 |
| 2008/0304637 | A1 * | 12/2008 | Ganganna | 379/88.23 |
| 2009/0328118 | A1 * | 12/2009 | Ravishankar et al. | 725/106 |
| 2011/0282955 | A1 * | 11/2011 | Appelman et al. | 709/206 |

* cited by examiner

*Primary Examiner* — Thjuan K Addy
(74) *Attorney, Agent, or Firm* — Merchant & Gould P.C.

(57) ABSTRACT

When a communication is directed to an intended recipient, a determination may be made by an intelligent communication disposition manager as to whether one or more available communication devices of the intended recipient are available for routing the incoming communication either based on device availability or routing previously defined by the intended recipient. The intelligent communication disposition manager may utilize presence data of the intended recipient for sending a notification of the incoming communication to one or more of the intended recipient's available communication devices. The intended recipient may select a preferred call routing option for the incoming call/message to be sent. Based on the real-time response from the intended recipient, the call/message may be routed to his/her preferred communication device.

22 Claims, 5 Drawing Sheets

INTELLIGENT DISPOSITION MANAGER

BACKGROUND

With modern communications systems, it is not uncommon for people to utilize multiple devices and various networks to communicate. Although having multiple modes of communication may help an intended recipient to be more reachable, a caller may have difficulty deciding which mode may be the best option for communicating with an intended recipient at a given time. By connecting to a packet-switched IP-based network, unified communication across multiple networks (e.g., wireless, PSTN, HFC, etc.) and multiple communication devices (e.g., computers, PDAs, wireless and wireline phones, interactive televisions, etc.) is possible.

Presence technology has evolved over time from its instant messaging (IM) origins to become an ever-increasingly valuable element of unified communications. By revealing more information about a contact, such as a location, status, current activity, or even a person's mood, communication may be enhanced. Although a caller may have presence information for a person he/she wishes to communicate with, he/she may still have to make a choice between several communication devices to reach the intended recipient.

While unified communication over a packet-switched network and presence technologies are well-known, there is a need to utilize presence data in addition to real-time notification methods to provide for more efficient and productive communication.

SUMMARY

Consistent with embodiments of the present invention, systems and methods are disclosed for providing a notification of an incoming call or message (communication) to an intended recipient on one or more communication endpoints, wherein the intended recipient may control the routing of the call or message based on his/her presence or a real-time response to the notification. By utilizing presence technology and by allowing for an intended recipient to make a decision on how to dispose of a call or message in real-time, an intelligent communication disposition management system may help a user control communications more efficiently.

In one embodiment of the present invention, an incoming call or message is routed to an intelligent communication disposition manager. When an incoming call or message is received, presence data of an intended recipient is retrieved and utilized to send a notification message to one or more of the intended recipient's communication devices as determined by the retrieved presence data. The intended recipient may select a preferred call routing option for the incoming call or message to be sent. Based on the real-time response from the intended recipient, the call or message may be routed to his/her preferred communication device.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

DETAILED DESCRIPTION

Figure 1:
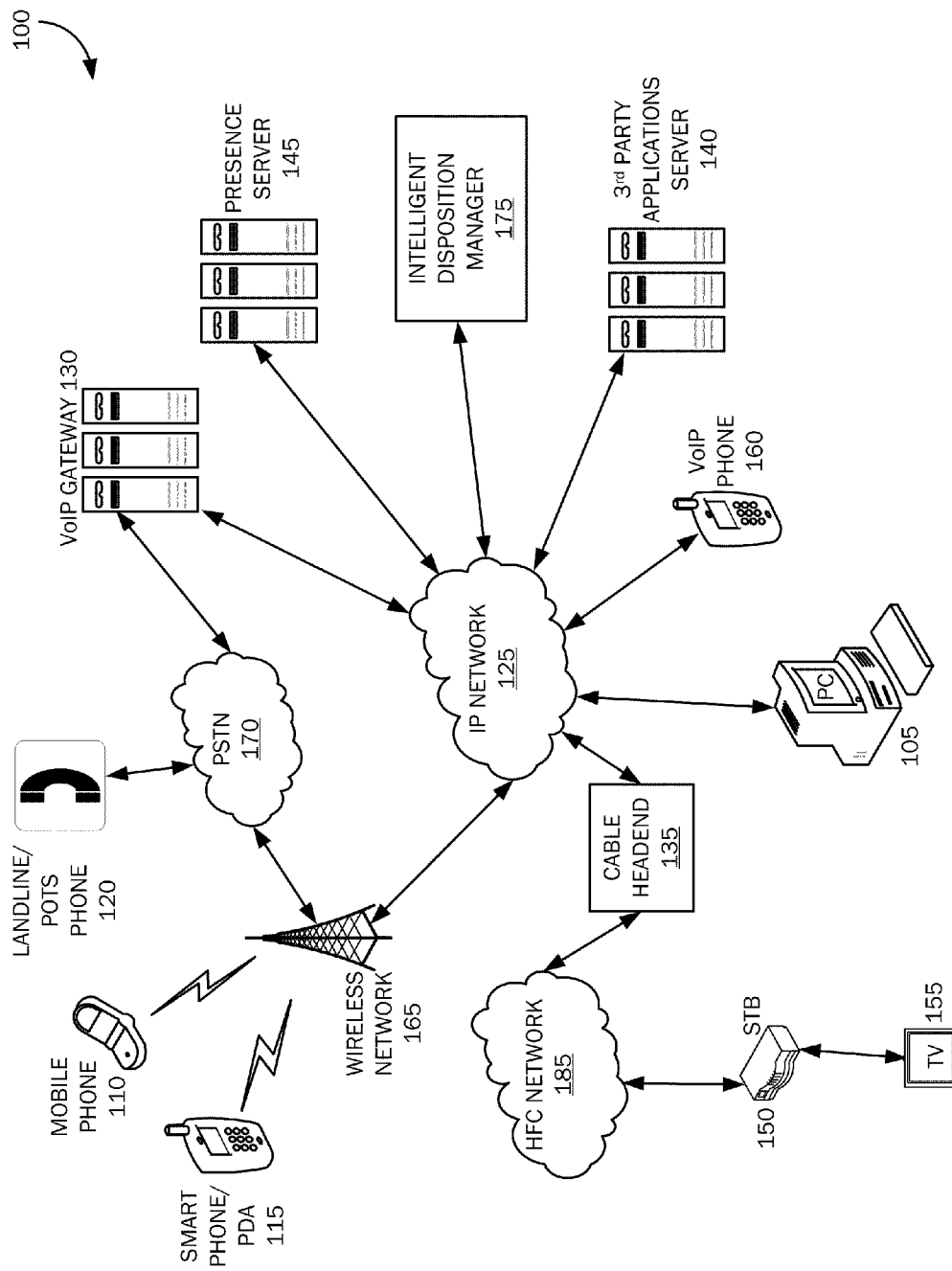
FIG. 1 is a block diagram of a communications distribution network 100.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Communication media including electronic media, telecommunications media, and broadcast media were once distinct and separate services. Recently, service providers are offering a convergence of services. A user may utilize a plurality of services on a single device. For example, a cable television set-top box may be utilized for not only television services, but may also be utilized for telephony, Internet services, e-mail, music, location-based services, etc. In accordance with common Internet Protocols (IP), devices may be utilized as a user interface to communicate over a packet-switched network.

FIG. 1 is a block diagram illustrating an architecture 100 that provides system and method for receiving and routing a call or message (also referred to herein generally as a "communication") to an optimal communication end point based on contact information and/or presence data associated with an intended recipient via a packet-switched network according to embodiments of the present invention. An IP-based (Internet Protocol) architecture provides for a variety of endpoint devices (e.g., personal computers 105, mobile phones 110, PDAs 115, digital phones, etc.) to communicate with one or more remote applications or other end-point devices via a distributed packet-switched network (e.g., Internet, WAN) 125.

As should be appreciated, numerous end-point devices may be utilized to send and/or receive calls and/or messages in various operating environments according to embodiments of the present invention, including but not limited to personal computers, server computers, wireline telephones, wireless telephones, digital phones, video phones, text messaging devices, VoIP phones, set-top boxes, personal digital assistants, handheld computing devices, and distributed computing environments that may include any of the above devices.

Wireless communication devices, such as a mobile phone 110, PDA 115, or other mobile computing devices may be connected to a wireless voice and data network 165. A wireless network may connect to a public switched telephone network (PSTN) 170 and/or may connect to a packet-switched network (Internet) 125 via a wireless network gateway. Plain old telephone system (POTS) and landline telephones 120 may connect to a wireless network 165 via a public switched telephone network (PSTN) 170. A VoIP network gateway 130 may serve as a translator between a PSTN 170 and IP networks 125. Dedicated VoIP phones 160 allow VoIP calls without the use of a computer 105. A VoIP phone 160 may connect directly to an IP network 125 to communicate with other endpoints. Personal computers 105 may connect to an IP network 125 for various communications, such as voice, e-mail, messaging, faxing, etc. As should be appreciated, transmission technologies for delivery of voice and/or data communications over IP networks such as the Internet or other packet-switched networks is a known technology to those skilled in the art and will not be discussed in extensive detail herein.

Recently, cable set-top boxes (STB) 150 have become more than a device in which to receive digital television, but may be used to provide a variety of services, including but not limited to, telephone services, high-speed Internet access, Video on Demand (VOD), and information services. A STB 150 may function to receive a stream of IP packets that may carry video, voice, and/or data information for display on a connected television set 155. A simplified block diagram illustrating a cable television/services system (hereafter referred to as "CATV") architecture that serves as an exemplary operating environment for the present invention will be described in further detail later in this document with reference to FIG. 5.

According to an embodiment of the present invention, a presence server 145 may be connected to an IP network 100 and may be utilized to receive current presence and availability data of a contact. A contact's presence information may be shared with others who may wish to know the availability or willingness of the contact to communicate. "Presentity" is a term defined as an entity described by presence information. The term "presentity" will herein be used to describe a person who is described by or associated with a presence status. A presence server 145 may be operable to receive presence information of multiple devices of a user. This functionality is referred to as multiple points of presence (MPOP). A presence server 145 may track the presence of a presentity's computer 105, mobile phone 110, PDA 115, landline/POTS phone 120, STB 150, etc.

According to one embodiment, presence information may be automatically updated to a presence server 145 every time a presentity's presence status changes. For example, if a presentity utilizes his/her mobile phone 110 to make a phone call, a presence server 145 may detect the utilization of the mobile phone 110 and change a presence state of the presentity's mobile phone 110 to "busy" and may include a descriptor, such as, "On a Call." According to another embodiment, a presentity's presence information may be manually entered by the presentity. For example, a presentity may go on vacation and may wish to not be contacted. He/she may manually set his/her presence as busy or unavailable on all communication devices. According to another embodiment, a presentity's electronic calendar may provide presence data that may be tracked by a presence server 145. For example, a presentity may have a meeting scheduled in his/her electronic calendar. A presence server 145 may detect the scheduled meeting and consider the presentity's presence state as busy.

According to an embodiment, an intelligent communication disposition manager 175 is a network-based software application module operable to receive and route a call or message to an optimal communication end point based on contact information and presence data associated with an intended recipient. When a call is made or a message is sent to an intended recipient, an intelligent communication disposition manager 175 may send a notification to various communication devices of the intended recipient. An intelligent communication disposition manager 175 may utilize contact information and presence information to determine to which a devices of an intended recipient to send a notification. Each communication device that a notification is sent to may respond to the notification. Options may be provided to each device on how to route the incoming call/message.

According to an embodiment, an intelligent communication disposition manager 175 may comprise a set of application programming interfaces (API) exposed to applications and operating systems that allow communication between applications and operating systems through common data calls understood via the API set. APIs may be operable to manage presence and contact information, in addition to message/call notifications and responses.

According to one embodiment, a presence server 145 may comprise a database for storing contact and presence information (e.g., telephone numbers, e-mail addresses, IP addresses, and availability data associated with each contact number/address). According to another embodiment, the aforementioned database may be located within an intelligent communication disposition manager 175. Contact and presence information may be in the form of Extensible Markup Language (XML) data structures in which a variety of programming interfaces may access. As should be appreciated, XML is only one available means for structuring data, and any other suitable data structuring model may be utilized according to the embodiments described herein. According to an embodiment, an intelligent communication disposition manager 175 and a presence server 145 may be separate systems located remotely and communicate across a network, or alternatively, may be a converged system.

Figure 2:
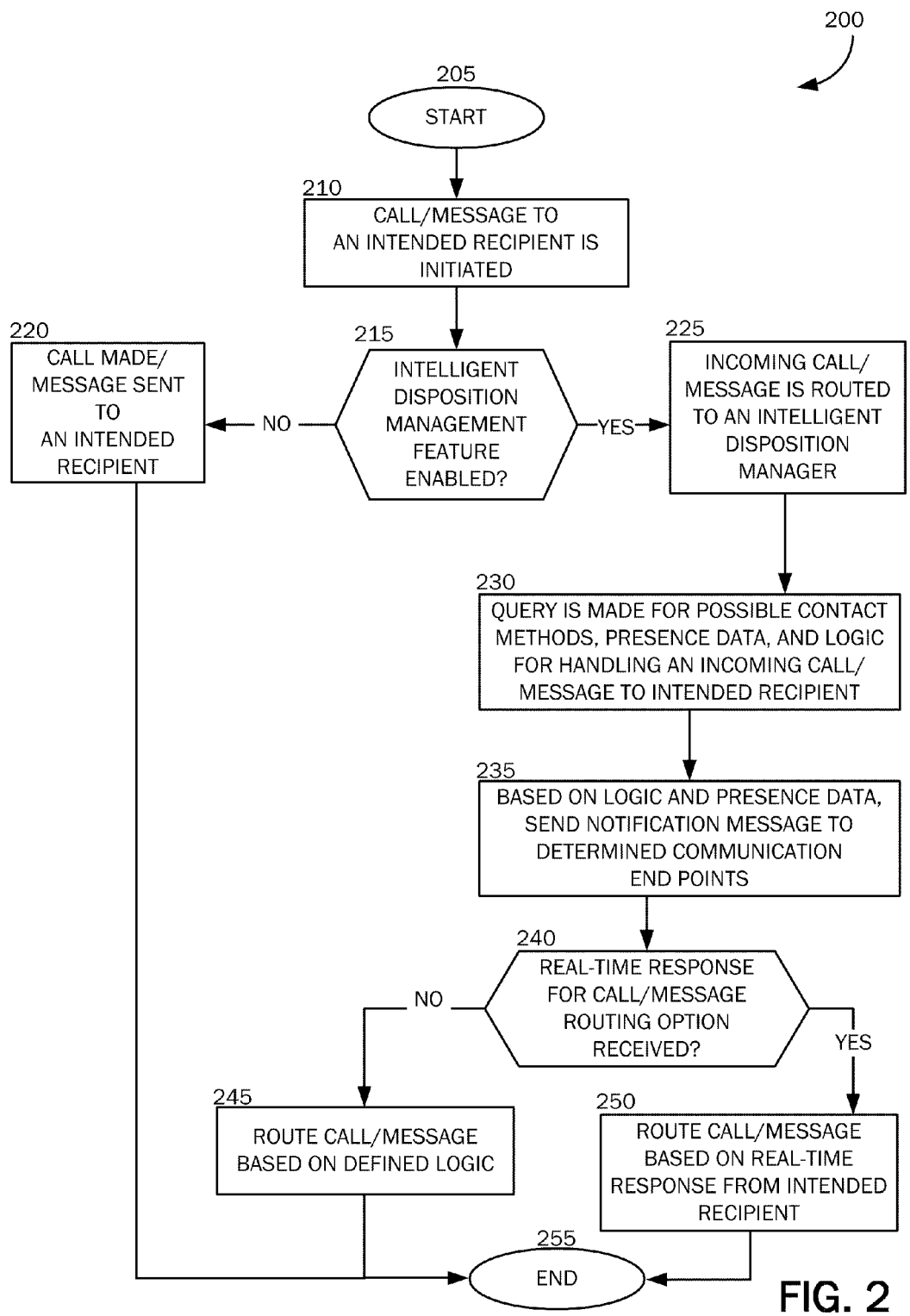
FIG. 2 is a flow diagram of a method 200 for providing intelligent communication disposition.

Having described elements of an architecture 100 that serves as an exemplary operating environment for embodiments of the present invention, FIG. 2 is a flow diagram of a method 200 for providing intelligent communication disposition management. The method 200 starts at OPERATION 205 and proceeds to OPERATION 210 where a user makes a call or sends a message to an intended recipient. A user may utilize one of many modes of communication (e.g., mobile phone, landline phone, VoIP phone, IM, e-mail, SMS, etc.). According to one embodiment, a user may specify a specific device of an intended recipient when making a call or sending a message. For example, a user may dial an intended recipient's mobile phone number to make a call. Alternatively, a user may select an intended recipient's name when making a call or sending a message, wherein one or more communication devices may be associated with the intended recipient's name. A user making a call or sending a message may depend on logic of a presence server 145 or other application to route the call or message.

The method 200 proceeds to OPERATION 215 where a determination is made as to whether an intelligent communication disposition management feature is enabled on an intended recipient's communication device. According to an embodiment, a data services system/database may contain information that allows for a determination to be made as to whether prerequisites for allowing a requested service are met for an intended recipient. If an intelligent communication disposition management feature is not an enabled feature for an intended recipient, the method 200 proceeds to OPERATION 220, where the call/message is passed through to the intended recipient's specified communication device. The method 200 then ends at OPERATION 255.

If an intelligent communication disposition management feature is an enabled feature for an intended recipient, the method 200 proceeds to OPERATION 225, where the call/message is routed to an intelligent communication disposition manager 175. As described earlier, an intelligent communication disposition manager may be network-based, and may communicate using a suitable protocol. The method 200 proceeds to OPERATION 230, where the intelligent communication disposition server 175 receives the call/message and makes a query for contact information and presence data associated with the intended recipient, in addition to logic (customized by an intended recipient or default settings) to make a determination as to what communication device(s) of the intended recipient may be available. According to an embodiment, the intelligent communication disposition server 175 may communicate with a presence server 145 for contact and presence data.

The method 200 proceeds to OPERATION 235, where, based on retrieved logic, contact, and presence data, a notification is sent to one or more communication devices associated with the intended recipient. According to an embodiment, the notification may be in one of a plurality of communication modes depending on the device receiving the notification. The notification may be sent as an e-mail, a text message, an audible message, a selectable visual display, or in various other ways known in the art.

The following is an example to aid in describing embodiments of the present invention. An example person, Bob, may be at work. His child's school may call his home number because his child is sick. The call is routed to an intelligent communication disposition manager, which makes a query and determines that Bob has an IM client application on his work computer open, his e-mail application is running, and that Bob is engaged in a call on his mobile phone. Based on this gathered information, the intelligent communication disposition manager may send a notification over Bob's IM client and to his e-mail, but not to his mobile phone that a phone call from ABC Elementary School with phone number XXX-XXX-XXXX is calling. The notification may provide options, such as to forward the call to a specified device (mobile phone, home phone, work phone, etc.), to send the call to voicemail, to deny the call, etc. Bob may receive the notification and select to forward the call to his work phone.

The method 200 proceeds to OPERATION 240, if a response to the notification is not received within a specified amount of time, the method proceeds to OPERATION 245, where the call or message may be routed based on a defined logic. The logic may be user-set, or may be a default setting. For example, if a response to a notification is not received within a specified amount of time, a call may automatically be routed to voicemail, to a home phone, or to an SMS account. According to user-set logic, the intended recipient may select a preferred call routing option for the incoming call or message to be sent. That is, a user may define that when a given set of routing means are available, a desired routing is to a specified device. For example, a user may define that if his/her cell phone, home phone and work phone are all available, then communication routing should proceed to his/her cell phone automatically without the user providing a response to the notification.

If a response is received within a specified amount of time, the method 200 proceeds to OPERATION 250, where the call or message is routed according to the response from the intended recipient. The method ends at OPERATION 255.

Figure 3:
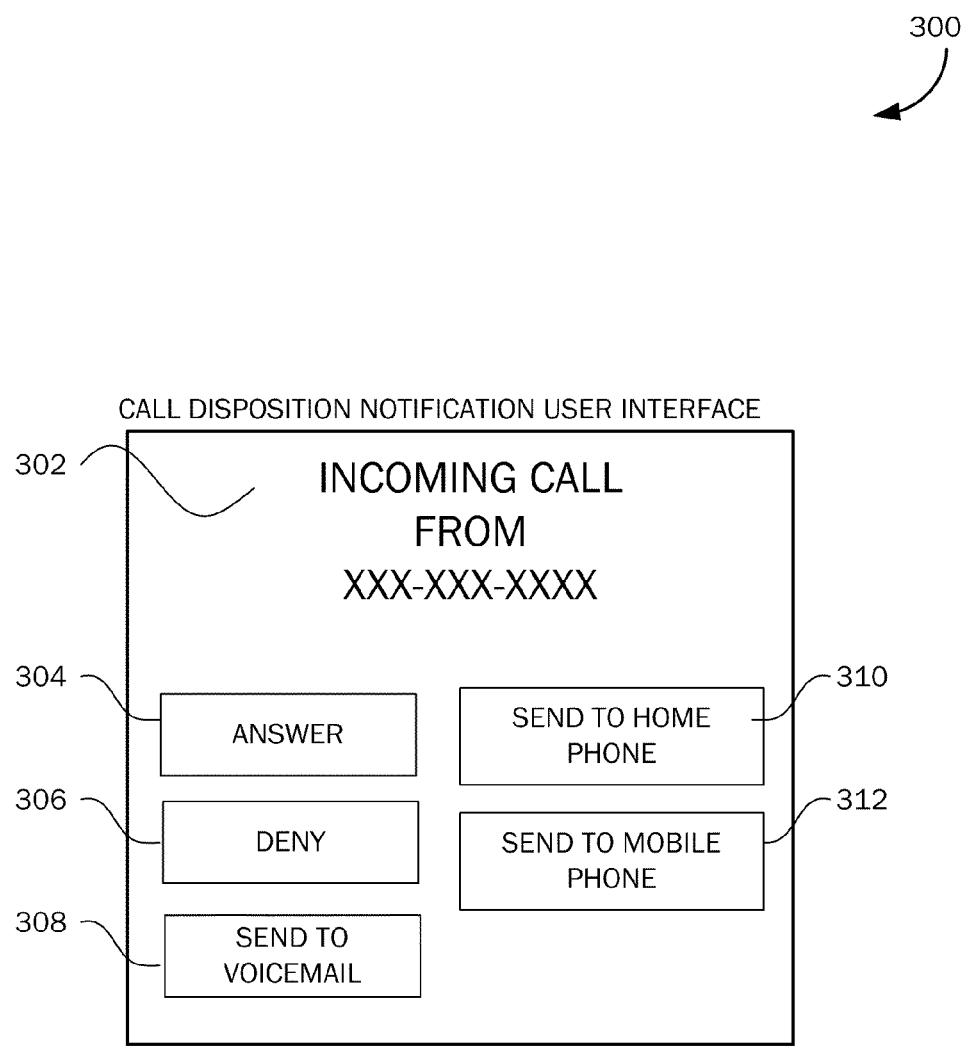
FIG. 3 is a simplified block diagram of an example interactive user interface display on a communication device receiving a notification of an incoming call according to embodiments of the present invention.

Having described an example process flow 200 of embodiments of the present invention, FIG. 3 is a simplified block diagram of an example communication disposition notification user interface 300. Referring to FIG. 3, the example user interface shows what may be shown on a display of a communication device when a call is made to an intended recipient. The example call disposition notification user interface 300 may comprise a message area 302, which may display one or more of a name, phone number, and/or address associated with a calling/sending communication device. Referring back to the previous example, the text within the message area 302 may read, "Incoming Call from ABC Elementary School XXX-XXX-XXXX."

Various options may be provided for allowing an intended recipient to decide how to handle an incoming call or message. An "Answer" option 304 may be provided. If an intended recipient selects an "Answer" option 304, a call may be routed a communication device from which the intended recipient made the selection. A "Deny" option 306 may be provided. If this option is selected, a call may be dropped or may be sent to voicemail, or may be routed according to a specified logic. A "Send to Voicemail" option 308 may be provided, which we selected, may route a call to the intended recipient's voice mailbox. A "Send to Home Phone YYY-YYY-YYYY" option 310 and/or a "Send to Mobile Phone ZZZ-ZZZ-ZZZZ" option 312 may be provided. When one of these options 310,312 is selected, a call may be routed to the indicated endpoint device. As should be appreciated, various options may be provided depending on an intended recipient's communication devices, client applications associated with those devices, presence information, as well as other factors.

According to an embodiment and as mentioned previously, a CATV STB 150 may be utilized as a gateway to deliver multiple services, which allows for interactivity through a user's television set 155. For example, an IP-enabled STB 150 may allow a user to "channel surf" streaming "HD Quality" television content (IPtv), navigate the Internet, watch Video on Demand (VOD), play video or Internet-based games, listen to music, make phone calls (VoIP), video conference, instant message (IM), run a full array of computing applications, securely store data, as well as various other network activities.

Figure 4:
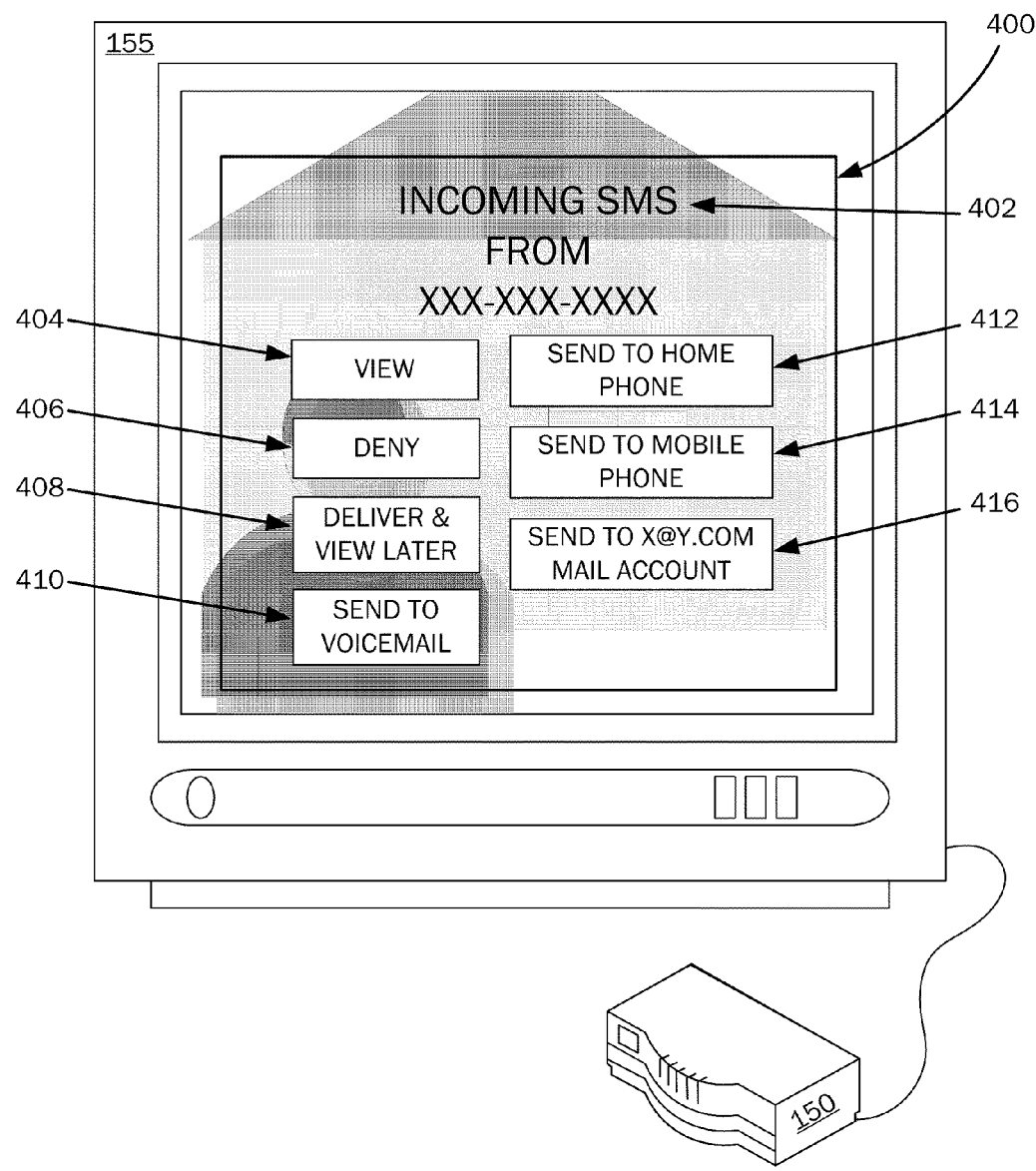
FIG. 4 is a simplified block diagram of an example interactive user interface display on a communication device receiving a notification of an incoming SMS message according to embodiments of the present invention.

According to an embodiment, a CATV STB 150 is an exemplary operating environment for embodiments of the present invention. An intended recipient of a call or message may receive a call or message to his/her CATV STB 150. FIG. 4 is a simplified block diagram of another example call disposition notification user interface 400. Referring to FIG. 4, the example user interface shows what may be displayed on a display of a television when a message, such as an SMS message, is sent to an intended recipient. The example call disposition notification user interface 400 may comprise a message area 402, which may display one or more of a name, phone number, and/or address associated with a sending communication device. Various options may be provided for allowing an intended recipient to decide how to handle the message. A "View" option 404 may be provided. If an intended recipient selects a "View" option 404, a message may be routed a communication device from which the intended recipient made the selection. So in this example, the SMS message may be displayed on the television screen. A "Deny" option 406 may be provided. If this option is selected, a message may be returned as undeliverable or may be sent to voicemail, or may be routed according to a specified logic. A "Send to Voicemail" option 408 may be provided, which we selected may convert a message to a voice message and sent to the intended recipient's voice mailbox. A "Send to Home Phone YYY-YYY-YYYY" option 410 and/or a "Send to Mobile Phone ZZZ-ZZZ-ZZZZ" option 412 may be provided. When one of these options 410,412 is selected, a message may be routed to the selected endpoint device. A "Send to X@Y.com Mail Account" option 414 may be provided, which when selected may route a message to the intended recipient's specified e-mail account. As should be appreciated, various options may be provided depending on an intended recipient's communication devices, client applications associated with those devices, presence information, as well as other factors.

Figure 5:
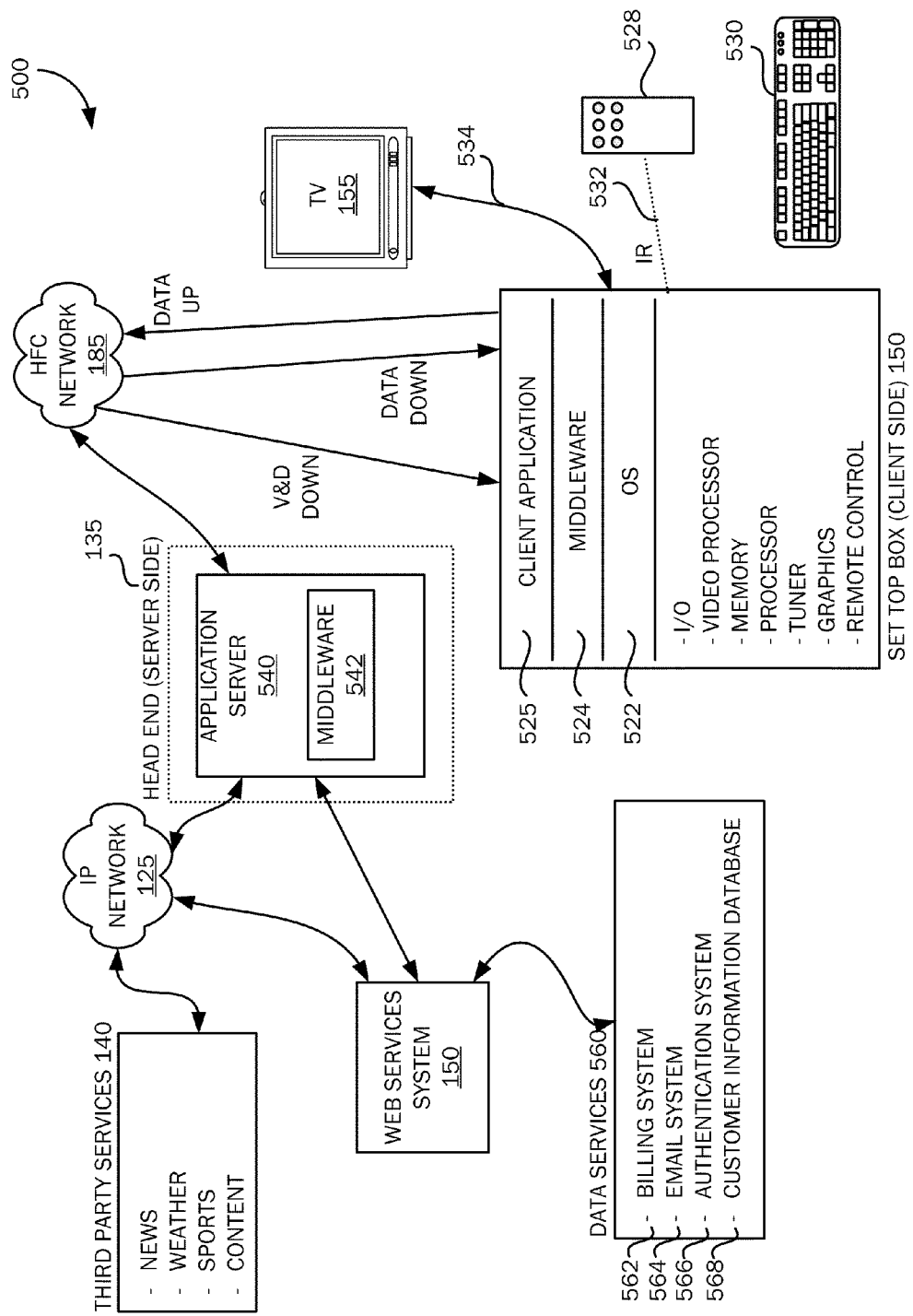
FIG. 5 is a block diagram of a cable television/services (CATV) system 500.

With reference to FIG. 5, a cable television/services system (hereafter referred to as "CATV") architecture 500 that serves as an exemplary operating environment for embodiments of the invention is described. Referring now to FIG. 5, digital and analog video programming, information content and interactive television services are provided via a hybrid fiber coax (HFC) network 185 to a television set 155 for consumption by a cable television/services system customer. As is known to those skilled in the art, HFC networks 185 combine both optical fiber and coaxial cable lines. Typically, optical fiber runs from the cable head end 135 to neighborhoods of 500 to 2,000 customers. Coaxial cable runs from the optical fiber feeders to each customer. According to embodiments of the present invention, the functionality of the HFC network 185 allows for efficient bidirectional data flow between the client-side set-top box 150 and the server-side application server 540 of the present invention.

According to embodiments of the present invention, the CATV system 500 is in the form of a distributed client-server computing system for providing video and data flow across the HFC network 185 between server-side services providers (e.g., cable television/services providers) via a server-side (backend) head end 135 and a client-side customer via a client-side set-top box (STB) functionally connected to a customer receiving device, such as the television set 155. As is understood by those skilled in the art, modern CATV systems 500 may provide a variety of services across the HFC network 185 including traditional digital and analog video programming, telephone services, high speed Internet access, video-on-demand, and information services.

On the client side of the CATV system 500, digital and analog video programming and digital and analog data are provided to the customer television set 155 via the set-top box (STB) 150. Interactive television services that allow a customer to input data to the CATV system 500 likewise are provided by the STB 150. As illustrated in FIG. 5, the STB 150 is a multipurpose computing device having a computer processor, memory and an input/output mechanism. The input/output mechanism of a STB 150 receives input from server-side processes via the HFC network 185 and from customers via input devices such as the remote control device 528 and the keyboard 530. The remote control device 528 and the keyboard 530 may communicate with the STB 150 via a suitable communication transport such as the infrared connection 532. The STB 150 also includes a video processor for processing and providing digital and analog video signaling to the television set 155 via a cable communication transport 534. A multi-channel tuner is provided for processing video and data to and from the STB 150 and the server-side head end system 135, described below.

The STB 150 also includes an operating system 522 for directing the functions of the STB 150 in conjunction with a variety of client applications 525. For example, if a client application 525 requires a news flash from a third-party news source to be displayed on the television 155, the operating system 522 may cause the graphics functionality and video processor of the STB 150, for example, to output the news flash to the television 155 at the direction of the client application 525 responsible for displaying news items.

Because a variety of different operating systems 522 may be utilized by a variety of different brands and types of set-top boxes, a middleware layer 524 is provided to allow a given software application to be executed by a variety of different operating systems. According to an embodiment of the present invention, the middleware layer 524 may include a set of application programming interfaces (API) that are exposed to client applications 525 and operating systems 522 that allow the client applications to communicate with the operating systems through common data calls understood via the API set. As described below, a corresponding middleware layer is included on the server side of the CATV system 500 for facilitating communication between the server-side application server and the client-side STB 150. According to one embodiment of the present invention, the middleware layer 542 of the server-side application server and the middleware layer 524 of the client-side STB 150 format data passed between the client side and server side according to the Extensible Markup Language (XML). As should be appreciated by those skilled in the art, although some embodiments described in this specification are oriented to middleware installed and executed on a STB 150, alternative embodiments implemented as firmware or as hardware are well within the scope of the present invention.

The set-top box 150 passes digital and analog video and data signaling to the television 155 via a one-way communication transport 534. The STB 150 may receive video and data from the server side of the CATV system 500 via the HFC network 185 through a video/data downlink and data via a data downlink. The STB 150 may transmit data from the client side of the CATV system 500 to the server side of the CATV system 500 via the HFC network 185 via one data uplink. The video/data downlink is an "in band" downlink that allows for digital and analog video and data signaling from the server side of the CATV system 500 through the HFC network 185 to the set-top box 150 for use by the STB 150 and for distribution to the television set 155. As is understood by those skilled in the art, the "in band" signaling space operates at a frequency between 54 and 860 megahertz. The signaling space between 54 and 860 megahertz is generally divided into 6 megahertz channels in which may be transmitted a single analog signal or a greater number (e.g., up to ten) digital signals.

The data downlink and the data uplink, illustrated in FIG. 5, between the HFC network 185 and the set-top box 150 comprise "out of band" data links. As is understood by those skilled in the art, the "out of band" frequency range generally lies between zero and 54 megahertz. According to embodiments of the present invention, data flow between the client-side set-top box 150 and the server-side application server 540 is typically passed through the "out of band" data links. Alternatively, an "in band" data carousel may be positioned in an "in band" channel into which a data feed may be processed from the server-side application server 540 through the HFC network 185 to the client-side STB 150. Operation of data transport between components of the CATV system 500, described with reference to FIG. 5, is well known to those skilled in the art.

Referring still to FIG. 5, the head end 135 of the CATV system 500 is positioned on the server side of the CATV system and includes hardware and software systems responsible for originating and managing content for distributing through the HFC network 185 to client-side STBs 150 for presentation to customers via televisions 155. As described above, a number of services may be provided by the CATV system 500, including digital and analog video programming, interactive television services, telephone services, video-on-demand services, targeted advertising, and provision of information content.

The application server 540 is a general-purpose computing system operative to assemble and manage data sent to and received from the client-side set-top box 150 via the HFC network 185. As described above with reference to the set-top box 150, the application server 540 includes a middleware layer 542 for processing and preparing data from the head end of the CATV system 500 for receipt and use by the client-side set-top box 150. For example, the application server 540 via the middleware layer 542 may obtain data from third-party services 140 via an IP network 125 for transmitting to a customer through the HFC network 185 and the set-top box 150. For example, a weather report from a third-party weather service may be downloaded by the application server via an IP network 125. When the application server 540 receives the downloaded weather report, the middleware layer 542 may be utilized to format the weather report for receipt and use by the set-top box 150. According to one embodiment of the present invention, data obtained and managed by the middleware layer 542 of the application server 540 is formatted according to the Extensible Markup Language and is passed to the set-top box 150 through the HFC network 185 where the XML-formatted data may be utilized by a client application 525 in concert with the middleware layer 524, as described above. As should be appreciated by those skilled in the art, a variety of third-party services data, including news data, weather data, sports data and other information content, may be obtained by the application server 540 via distributed computing environments such as an IP network or the Internet 125 for provision to customers via the HFC network 185 and the set-top box 150. According to an embodiment of the present invention, digital video recording functionality may be located remotely on the head end (server side) 135 and called upon by a client set-top box 150.

According to embodiments of the present invention, the application server 540 obtains customer profile data from services provider data services 560 for preparing a customer profile that may be utilized by the set-top box 150 for tailoring certain content provided to the customer and for pre-populating product/services order forms and customer lead generation forms. As illustrated in FIG. 5, the services provider data services 560 include a number of services operated by the services provider of the CATV system 500 which may include data on a given customer. For example, a billing system 562 may include information such as a customer's name, street address, business identification number, Social Security number, credit history, and information regarding services and products subscribed to by the customer. An electronic mail system 564 may contain information such as electronic mail addresses, high-speed Internet access subscription information and electronic mail usage data. An authentication system 566 may include information such as secure user names and passwords utilized by customers for access to network services.

The customer information database 568 may include general information about customers such as place of employment, business address, business telephone number and demographic information such as age, gender, educational level, and the like. The customer information database may also include information on products and services subscribed to by a customer from her cable services provider. For example, in accordance with embodiments of the present invention, the customer information database may contain data to allow a determination as to whether a particular product or service is already provisioned at a customer service address or whether a work order is pending for a particular product or service provisioning at the customer service address. The customer information database may also include information that allows for a determination as to whether prerequisites for provisioning a requested product of service are met by a requesting customer. For example, if a customer requests electronic mail services and high speed Internet access is a prerequisite for electronic mail services, the customer information database may be queried to determine whether the required Internet access is provisioned at the requesting customer location or address.

As should be understood by those skilled in the art, the disparate data services systems 562, 564, 566, 568 are illustrated as a collection of data services for purposes of example only. The example data services systems comprising the data services 560 may operate as separate data services systems, which communicate with a web services system (described below) along a number of different communication paths and according to a number of different communication protocols.

Referring still to FIG. 5, a web services system 550 is illustrated between the application server 540 and the data services 560. According to embodiments of the present invention, the web services system 550 serves as a collection point for data requested from each of the disparate data services systems comprising the data services 560. When the application server 540 requires customer profile data from one or more of the data services 560 for preparation or update of a customer profile, the application server 540 passes a data query to the web services system 550. The web services system formulates a data query to each of the available data services systems for obtaining any available data for a given customer as identified by a set-top box identification associated with the customer. The web services system 550 serves as an abstraction layer between the various data services systems and the application server 540. That is, the application server 540 is not required to communicate with the disparate data services systems, nor is the application server 540 required to understand the data structures or data types utilized by the disparate data services systems. The web services system 550 is operative to communicate with each of the disparate data services systems for obtaining necessary customer profile data. The customer profile data obtained by the web services system is assembled and is returned to the application server 540 for ultimate processing via the middleware layer 542, as described above.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention. Although embodiments of the present invention have been described with reference to particular standards and protocols, the present invention is not limited to such standards and protocols.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing intelligent communication disposition management, the method comprising:
   receiving a message for an intended recipient;
   determining one or more available communication devices of the intended recipient;
   sending a notification to one or more of the determined available communication devices, the sent notification providing one or more options for handling the message including viewing the message, denying the message, delivering the message, and sending the message to an e-mail address;
   if a response to the sent notification from one of the one or more available communication devices of the intended recipient is not received within a specified amount of time, routing the message according to a default setting; and
   upon receiving the response to the sent notification from one of the one or more available communication devices of the intended recipient within the specified amount of time, routing the message based on the received response.

2. The method of claim 1, wherein receiving the message for the intended recipient includes receiving one or more messages in one of a plurality of communication modes.

3. The method of claim 2, wherein the plurality of communication modes comprises voice communication, video communication, data communication, text message communication, electronic mail communication, and multimedia communication.

4. The method of claim 1, wherein available communication devices of the intended recipient are coupled to an Internet Protocol (IP)-based network.

5. The method of claim 1, wherein determining one or more available communication devices of the intended recipient is based on retrieved contact and presence data.

6. The method of claim 1, wherein contact data for the intended recipient comprises one or more predetermined communication device identifiers at which the intended recipient may be contacted.

7. The method of claim 6, wherein the predetermined communication device identifiers may comprise one of a telephone number, an e-mail address, an instant messaging address, a personal digital assistant number, a fax number, a set-top box address, or a voice over Internet protocol (VoIP) address.

8. The method of claim 1, wherein presence data of the intended recipient may be detected by a presence server.

9. The method of claim 1, wherein if the response to the sent notification from a communication device of the intended recipient is not received within the specified amount of time, comprising routing the message according to a specified communication routing logic.

10. The method of claim 1, wherein the default setting includes a user-specified routing defined by the intended recipient.

11. The method of claim 1, wherein the notification is sent in one or more of a plurality of communication modes based on the receiving communication device.

12. The method of claim 11, wherein the one or more of the plurality of communication modes in which the notification may be sent may include e-mails, text messages, audible messages, and selectable visual displays.

13. The method of claim 1, wherein one or more available communication devices may comprise a personal computer, a server computer, a wireline telephone, a wireless telephone, a digital phone, a video phone, a text messaging device, a VoIP phone, a set-top box, a personal digital assistant, a handheld computing device, or a distributed computing environment that may include any of said one or more available communication devices.

14. A system for providing intelligent communication disposition management, comprising:
   an intelligent communication disposition manager application operative to:
      receive a message for an intended recipient;
      determine one or more available communication devices of the intended recipient;
      send a notification to the determined available communication devices, the sent notification providing one or more options for handling the message including viewing the message, denying the message, delivering the message, and sending the message to an e-mail address;
      if a response to the sent notification from one of the one or more available communication devices of the intended recipient is not received within a specified amount of time, routing the message according to a default setting; and
      upon receiving the response to the sent notification from a communication device of the intended recipient within the specified amount of time, route the message based on the received response.

15. The system of claim 14, wherein available communication devices of the intended recipient are coupled to an Internet Protocol (IP)-based network.

16. The system of claim 14, wherein contact data for the intended recipient comprises one or more predetermined communication device identifiers at which the intended recipient may be contacted.

17. The system of claim 16, wherein the predetermined communication device identifiers may comprise a telephone number, an e-mail address, an instant messaging address, a personal digital assistant number, a fax number, a set-top box address, or a voice over Internet protocol (VoIP) address.

18. The system of claim 14, wherein one or more available communication devices comprises a personal computer, a server computer, a wireline telephone, a wireless telephone, a digital phone, a video phone, a text messaging device, a VoIP phone, a set-top box, a personal digital assistant, a handheld computing device, or a distributed computing environment that may include any of said one or more available communication devices.

19. The system of claim 14, wherein the notification is sent in one or more of a plurality of communication modes based on the receiving communication device.

20. The system of claim 14, wherein the one or more of a plurality of communication modes in which the notification may be sent includes e-mails, text messages, an audible messages, and selectable visual displays.

21. A computer readable medium, not including a carrier wave, containing computer executable instructions which when executed by a computer perform a method for providing intelligent communication disposition management, the method comprising:

receiving a text message for an intended recipient;

determining one or more available communication devices of the intended recipient;

sending a notification to the determined available communication devices, the sent notification providing one or more options for handling the text message including viewing the text message, denying the text message, delivering the text message, and sending the text message to an e-mail address;

if a response to the sent notification from one of the one or more available communication devices of the intended recipient is not received within a specified amount of time, routing the text message according to a default setting; and upon receiving the response to the sent notification from a communication device of the intended recipient within the specified amount of time, routing the text message based on the received response.

22. The method of claim 1, wherein receiving the message is an SMS text message.

\* \* \* \* \*